Figure 1:
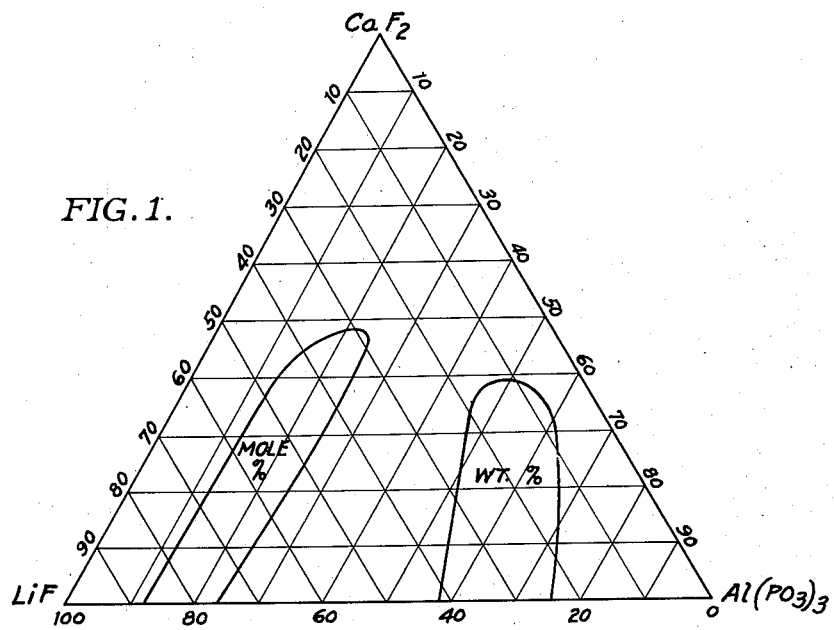

KUAN-HAN SUN
MAURICE L. HUGGINS
INVENTORS

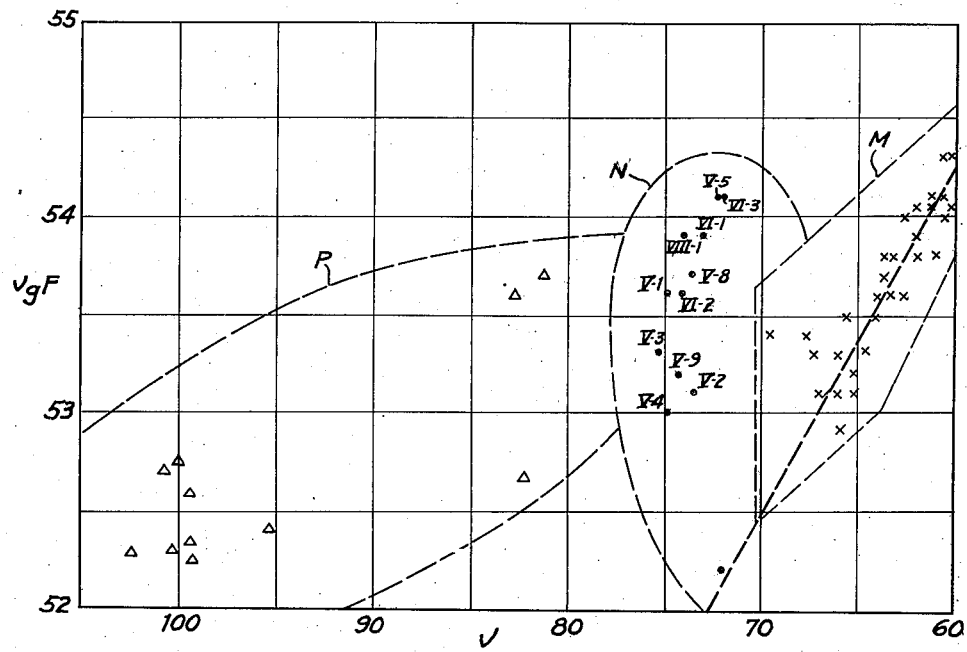

Patented Sept. 13, 1949

2,481,700

UNITED STATES PATENT OFFICE 2,481,700

FLUOPHOSPHATE GLASS

Kuan-Han Sun and Maurice L. Huggins, Rochester, N. Y., assignors to Eastman Kodak Company, Rochester, N. Y., a corporation of New Jersey Application January 29, 1946, Serial No. 644,178

7 Claims. (Cl. 106—47)

The present invention relates to novel glasses and glass batches from which they are made and, in particular, to fluophosphate glasses having novel compositions and unique and extremely desirable optical properties.

Our new glasses may be briefly described as essentially and primarily phosphate glasses, preferably and in most examples herein given consisting of beryllium phosphate, aluminum phosphate or beryllium-aluminum phosphate, but containing also fluorides in such quantity that the atomic ratio F/P is above 0.23 and in most cases below 2.9, the fluoride being in many instances, but not necessarily, introduced partially or entirely as an alkali metal fluoride and in most cases containing other metallic components besides those mentioned. The phosphate is the "glass former," and we preferably use the beryllium and aluminum phosphates, resulting in high Abbe values. For practical considerations, we have used aluminum meta- and ortho-phosphates and beryllium meta-phosphate in most cases.

While it is known that fluoride in small amounts may be present in phosphate glass, such glasses with relatively large proportions of fluorine with respect to phosphorus have not been known. Such glasses have very high Abbe values, in most cases over 70, abnormally high blue partial dispersion ratios, and abnormally low red partial dispersion ratios. Moreover, they have a low melting temperature, thereby decreasing the potential volatilization loss.

The general systems of fluophosphate glasses herein disclosed are: AF—Al(PO₃)₃; AF—AlPO₄; AF—Be(PO₃)₂; AF—MF$_n$—Al(PO₃)₃; and AF—MF$_n$—Be(PO₃)₂; where A represents one or more of lithium, sodium, or potassium, and MF$_n$ represents one or more of the following fluorides: MgF₂, CaF₂, SrF₂, BaF₂, ZnF₂, LaF₃, and ThF₄.

As disclosed in our pending application, Serial No. 568,314, filed December 15, 1944, glass may be formed by introducing phosphates in limited amount in a fluoride glass, the resulting glass being still essentially a fluoride glass and having the optical properties identified with such glass. In all of the examples given in that application the ionic percentage of fluorine was in most cases above 60, the minimum being 48.34.

The present glasses are in general characterized by being essentially phosphate, an ionic percentage of fluorine much less than in those examples, an F/P ratio between .23 and 2.9, a low melting temperature, an $n_D$ value between 1.45 and 1.55, and an Abbe value above 70. The low melting temperature, below 850° C. for most of the examples given, and not over 1100° C. for any of them, is an important feature in that it cuts down the potential volatilization loss of gaseous components in fluo-phosphate melts.

We will first show the ranges of proportions in which some of the glasses having the characteristics mentioned may be found and then give numerous specific examples within those ranges, as well as other examples of other systems, within the scope of the claims.

The first table, I, gives the proportions by weight and mole for several binary systems, each consisting of an alkali metal fluoride and a phosphate of aluminum or beryllium. The range of proportions of the alkali metal fluoride and the ratio of the number of atoms of fluorine to the number of atoms of phosphorus are given.

Table I

| Systems | AF Wt. Per Cent | AF Mole Per Cent | F/P |
|---|---|---|---|
| LiF-Al(PO₃)₃ | 24–39 | 76–87 | 1.1–2.2 |
| NaF-Al(PO₃)₃ | 24–41 | 66–81 | 0.7–1.4 |
| KF-Al(PO₃)₃ | 32–46 | 68–79 | 0.7–1.3 |
| LiF-AlPO₄ | 26–31 | 62–68 | 1.6–2.1 |
| NaF-AlPO₄ | 20–36 | 42–62 | 0.7–1.6 |
| KF-AlPO₄ | 31–36 | 49–53 | 1.0–1.1 |
| LiF-Be(PO₃)₂ | 10–39 | 32–81 | 0.23–2.1 |
| NaF-Be(PO₃)₂ | 10–50 | 32–80 | .23–2.0 |
| KF-Be(PO₃)₂ | 14–54 | 32–77 | .23–1.7 |

In the next table, showing the ranges of proportions of the components of certain ternary systems, AF represents lithium or sodium fluoride; MF₂ represents the fluoride of magnesium, calcium, strontium, barium, or zinc; and R(PO₃)$_y$ represents Al(PO₃)₃ or Be(PO₃)₂.

Table II

| Systems | AF Weight Per Cent | AF Mole Per Cent | MF₂ Weight Per Cent | MF₂ Mole Per Cent | R(PO₃)$_y$ Weight Per Cent | R(PO₃)$_y$ Mole Per Cent | Highest F/P |
|---|---|---|---|---|---|---|---|
| LiF-MgF₂-Al(PO₃)₃ | 13–39 | 46–87 | 0–29 | 0–37 | 56–76 | 17–24 | 2.3 |
| LiF-CaF₂-Al(PO₃)₃ | 8–39 | 29–87 | 0–39 | 0–48 | 46–76 | 13–24 | 2.9 |
| LiF-SrF₂-Al(PO₃)₃ | 12–39 | 47–87 | 0–48 | 0–38 | 40–76 | 15–24 | 2.7 |
| LiF-BaF₂-Al(PO₃)₃ | 8–39 | 42–87 | 0–58 | 0–42 | 33–76 | 13–28 | 2.6 |
| LiF-ZnF₂-Al(PO₃)₃ | 12–39 | 48–87 | 0–38 | 0–34 | 50–76 | 18–24 | 2.2 |
| NaF-CaF₂-Al(PO₃)₃ | 25–41 | 55–81 | 0–23 | 0–27 | 52–76 | 18–34 | 2.0 |
| LiF-CaF₂-Be(PO₃)₂ | 15–39 | 45–81 | 0–30 | 0–30 | 55–90 | 19–74 | 2.1 |
| LiF-SrF₂-Be(PO₃)₂ | 13–39 | 46–81 | 0–35 | 0–26 | 52–90 | 19–74 | 2.1 |
| LiF-BaF₂-Be(PO₃)₂ | 10–39 | 42–81 | 0–40 | 0–26 | 50–90 | 19–74 | 2.1 |

In the following tables of batch compositions the weight per cent of each ingredient is in each case given on the left and the mole per cent on the right. Table III gives examples consisting only of alkali metal fluoride and an aluminum phosphate.

In these examples, mixtures of fluorides of divalent metals are given, and in general, for reasons elsewhere pointed out, these are preferable over the simpler formulas.

*Table VI*

|          | VI-1 | | VI-2 | | VI-3 | | VI-4 | | VI-5 | | VI-6 | | VI-7 | |
|----------|------|------|------|------|------|------|------|------|------|------|------|------|------|------|
|          | W | M | W | M | W | M | W | M | W | M | W | M | W | M |
| LiF      | 8 | 35.5 | 8 | 33.8 | 8 | 35.4 | 14.5 | 49.8 | 13.5 | 46.9 | 6.6 | 26.4 | 7.3 | 33.0 |
| KF       |   |      |   |      |   |      |      |      |      |      | 11.5 | 20.6 |     |      |
| $CaF_2$  | 17 | 25.1 | 24 | 33.7 | 16 | 23.6 | 25.5 | 29.1 | 25.0 | 28.9 | 13.7 | 18.2 | 15.3 | 23.0 |
| $SrF_2$  |    |      |    |      | 5 | 4.6 | 1.5 | 1.1 | 2.0 | 1.4 | 1.0 | 0.8 | 1.1 | 1.0 |
| $BaF_2$  | 30 | 19.7 | 20 | 12.5 | 25 | 16.4 | 2.0 | 1.0 | 2.0 | 1.0 | 24.0 | 14.3 | 26.8 | 18.0 |
| $ZnF_2$  |    |      |    |      |    |      |      |      | 1.0 | 0.9 | 0.8 | 0.8 | 0.9 | 1.0 |
| $MgF_2$  |    |      |    |      |    |      |      |      | 1.5 | 2.2 | 1.4 | 2.3 | 1.6 | 3.1 |
| $Al(PO_3)_3$ | 45 | 19.7 | 48 | 20.0 | 46 | 20.0 | 56.5 | 19.0 | 55.0 | 19.7 | 42.0 | 16.5 | 47.0 | 20.9 |
| F/P      | 2.12 | | 2.10 | | 2.08 | | 1.97 | | 1.91 | | 2.42 | | 2.03 | |
| n        | 1.5305 | | 1.5205 | | 1.5427 | | | | 1.513 | | | | | |
| ν        | 73.0 | | 74.2 | | 72.0 | | | | 74.0 | | | | | |

*Table III*

|          | Example III-1 | | Example III-2 | |
|----------|---------------|------|---------------|------|
|          | Weight per cent | Mole per cent | Weight per cent | Mole per cent |
| LiF      | 32 | 82.7 |    |      |
| NaF      |    |      | 32 | 57.7 |
| $Al(PO_3)_3$ | 68 | 17.3 |    |      |
| $AlPO_4$ |    |      | 68 | 42.3 |
| F/P      | 1.59 | | 1.36 | |
| $n_D$    | 1.4873 | | 1.4764 | |
| ν        | 73.9 | | 70.9 | |

Table IV gives examples consisting only of alkali metal fluoride and beryllium phosphate or its equivalent.

The following two examples show formulas including fluorides of metals of higher valence in addition to alkali metal fluorides:

*Table VII*

|          | Example VII-1 | |
|----------|---------------|------|
|          | Weight Per Cent | Mole Per Cent |
| Lithium fluoride | 17 | 69.3 |
| Thorium fluoride ($ThF_4$) | 45 | 15.4 |
| $Al(PO_3)_3$ | 38 | 15.2 |
| F/P      | 2.87 | |
| $n_D$    | 1.52 | |
| ν        | 70.7 | |

*Table IV*

|          | Example IV-1 | | Example IV-2 | | Example IV-3 | | Example IV-4 | | Example IV-5 | | Example IV-6 | |
|----------|--------------|------|--------------|------|--------------|------|--------------|------|--------------|------|--------------|------|
|          | Weight Per Cent | Mole Per Cent | Weight Per Cent | Mole Per Cent | Weight Per Cent | Mole Per Cent | Weight Per Cent | Mole Per Cent | Weight Per Cent | Mole Per Cent | Weight Per Cent | Mole Per Cent |
| LiF      | 10 | 41.7 | 14 | 31.7 |    |      |    |      |    |      | 14 | 31.1 |
| NaF      |    |      |    |      | 30 | 63.0 | 39 | 71.8 | 35 | 51.7 |    |      |
| $Be(PO_3)_2$ | 90 | 58.3 |    |      | 70 | 37.0 | 61 | 28.2 |    |      |    |      |
| BeO      |    |      | 17 | 39.8 |    |      |    |      | 9.8 | 24.2 | 18 | 41.4 |
| $P_2O_5$ |    |      | 69 | 28.5 |    |      |    |      | 55.2 | 24.1 | 68 | 27.5 |
| F/P      | 0.36 | | 0.56 | | 0.85 | | 1.27 | | 1.07 | | 0.57 | |
| $n_D$    | 1.5098 | | 1.5208 | | 1.477 | | 1.446 | | 1.452 | | 1.521 | |
| ν        | 70.4 | | 71.1 | | 75.0 | | | | 70.0 | | 75.0 | |

The following are examples of simple formulas using only a single fluoride of a divalent metal in addition to the alkali metal fluoride and the phosphate:

*Table V*

|          | V-1 | | V-2 | | V-3 | | V-4 | | V-5 | | V-6 | | V-7 | | V-8 | | V-9 | |
|----------|-----|------|-----|------|-----|------|-----|------|-----|------|-----|------|-----|------|-----|------|-----|------|
|          | W | M | W | M | W | M | W | M | W | M | W | M | W | M | W | M | W | M |
| LiF      | 14 | 47.5 | 15 | 53.5 | 15 | 50.1 | 15 | 49.4 | 9 | 44.2 | 10 | 46.7 | 28 | 75.9 |    |      | 15 | 44.8 |
| NaF      |    |      |    |      |    |      |    |      |    |      |    |      |    |      | 25 | 54.7 |    |      |
| $CaF_2$  | 30 | 33.8 | 20 | 23.7 | 28 | 31.1 | 30 | 32.8 |    |      |    |      |    |      | 23 | 27.1 | 30 | 29.7 |
| $BaF_2$  |    |      |    |      |    |      |    |      | 49 | 35.5 | 52 | 35.9 |    |      |    |      |    |      |
| $ZnF_2$  |    |      |    |      |    |      |    |      |    |      |    |      | 12 | 8.2 |    |      |    |      |
| $Al(PO_3)_3$ | 56 | 18.7 | 65 | 22.8 | 57 | 18.7 | 55 | 17.7 | 42 | 20.3 | 38 | 17.4 | 60 | 16.0 | 52 | 18.1 |    |      |
| $Be(PO_3)_2$ |    |      |    |      |    |      |    |      |    |      |    |      |    |      |    |      | 55 | 25.5 |
| F/P      | 2.05 | | 1.48 | | 2.00 | | 2.17 | | 1.89 | | 2.27 | | 1.92 | | 2.01 | | 2.04 | |
| $n_D$    | 1.5043 | | 1.5138 | | 1.5080 | | 1.5025 | | 1.5363 | | 1.531 | | 1.4954 | | 1.4677 | | 1.4895 | |
| ν        | 74.9 | | 73.4 | | 75.2 | | 74.8 | | 72.2 | | 73.0 | | 71.6 | | 73.9 | | 74.4 | |

Table VIII

|  | Example VIII-1 | |
|---|---|---|
|  | Weight Per Cent | Mole Per Cent |
| Lithium fluoride | 4 | 19.1 |
| Sodium fluoride | 5 | 14.8 |
| Magnesium fluoride | 2 | 4.0 |
| Calcium fluoride | 6 | 9.6 |
| Strontium fluoride | 15 | 14.8 |
| Barium fluoride | 20 | 14.2 |
| Lanthanum fluoride (LaF$_3$) | 6 | 3.8 |
| Al(PO$_3$)$_3$ | 42 | 19.8 |
| F/P | 2.20 | |
| $n_D$ | 1.5152 | |
| $\nu$ | 74.0 | |

Although in all of the examples above given alkali metal fluoride is present, usually in considerable amount, and the phosphate included in the batch is of either beryllium or aluminum, we consider as included in the scope of our inventions glasses made from batches containing only fluorides of metals having a higher valence than one and/or phosphates of other elements than beryllium and aluminum. Examples of these will now be given. In Table IX are included examples containing no alkali metal fluoride. The data given in parentheses are equivalent to those elsewhere given.

Table IX

|  | IX-1 | | IX-2 | | IX-3 | | IX-4 | |
|---|---|---|---|---|---|---|---|---|
|  | W | M | W | M | W | M | W | M |
| CaF$_2$ |  |  |  |  |  |  | 18.0 | 32 |
| BaF$_2$ | 32 | 30.9 | 25 | 24.1 |  |  |  |  |
| AlF$_3$ |  |  |  |  | 15 | 13.4 |  |  |
| Be(PO$_3$)$_2$ | 68 | 69.1 | 75 | 75.9 | (85 | 86.6) | 82.0 | 68 |
| BeO |  |  |  |  | 17 | 50.8 | (12.3) |  |
| P$_2$O$_5$ |  |  |  |  | 68 | 35.8 | (69.7) |  |
| F/P | 0.45 |  | 0.32 |  | 0.56 |  | 0.47 |  |
| $n_D$ | 1.547 |  |  |  | 1.487 |  | 1.5289 |  |
| $\nu$ |  |  |  |  |  |  | 72.4 |  |

It is well known that glasses cannot be formed in all proportions of the ingredients; and to illustrate this in one only of the systems herein disclosed, reference is made to Figure 1 in which the glass formation region is indicated for a ternary system including lithium and calcium fluorides and aluminum metaphosphate, the curved lines showing the approximate limits in mole per cent and in weight per cent. In this system a melting temperature of not over 850° C. is used.

Figure 2:
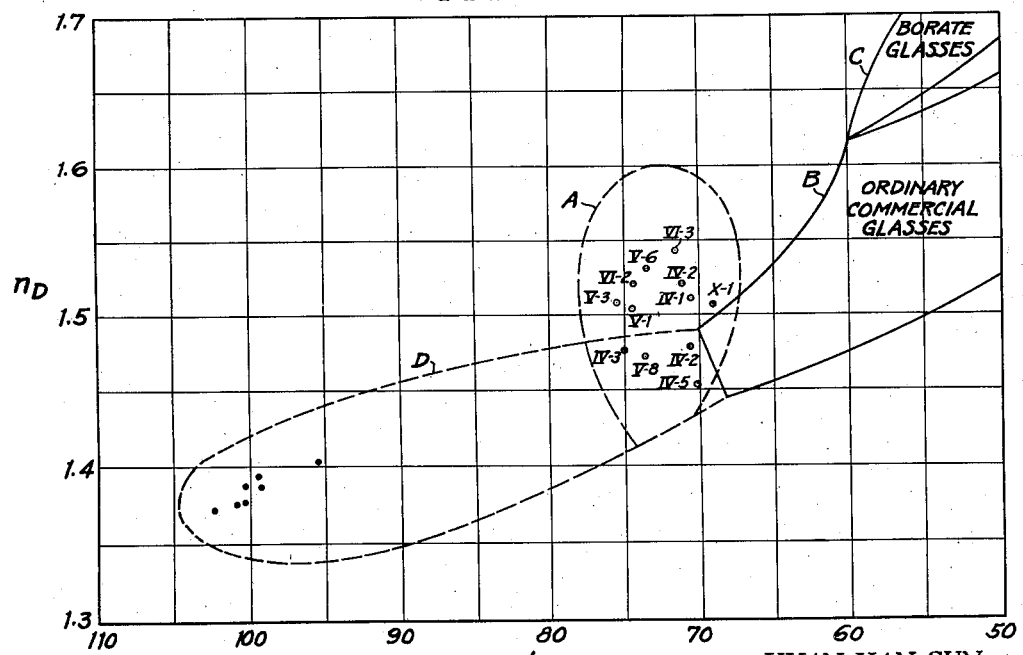

In Figure 2, $n_D$ is plotted against $\nu$ for some of the examples for which these properties are known. The areas of previously known glasses are indicated, and it is evident that the new glasses have optical values in fields not hitherto available. Area B indicates the region for the most common commercial glasses; C, the rare-element borate glasses disclosed in Morey Reissue Patent 21,175; D, fluoride glasses. It is to be understood that these areas are approximate only and are not as sharply defined as these boundary lines would seem to imply. A indicates approximately the area within which these values fall for fluophosphate glasses.

The values of $n_D$ and $\nu$ are given above, where known, for each formula; and in addition certain other optical properties of some of the examples are given in Tables X and XI. Table X gives the dispersion between certain lines of the spectrum, and Table XI gives the partial dispersion ratios between certain lines; for two wave lengths, $\lambda_1$ and $\lambda_2$, $$\nu_{\lambda_1\lambda_2} = \frac{n_{\lambda_1} - n_{\lambda_2}}{n_F - n_C}$$

Table X

| Sample No. | $n_F - n_C$ | $n_m - n_h$ | $n_h - n_g$ | $n_g - n_F$ | $n_F - n_D$ | $n_d - n_C$ | $n_D - n_{A'}$ |
|---|---|---|---|---|---|---|---|
| IV-1 | 0.00724 |  | 0.00312 | 0.00378 | 0.00505 | 0.00398 |  |
| V-1 | .00673 |  |  | .00361 | .00475 | .00369 |  |
| V-2 | .00700 |  | .00306 | .00372 | .00492 | .00382 | 0.00458 |
| V-3 | .00676 | 0.00492 | .00297 | .00360 | .00474 | .00368 | .00443 |
| V-4 | .00673 |  | .00294 | .00357 | .00471 | .00367 | .00439 |
| V-5 | .007435 |  | .00330 | .00402 | .00523 | .00405 | .00479 |
| V-7 | .00692 |  | .00305 | .00368 | .00486 | .00377 |  |
| V-8 | .00633 |  | .00280 | .00340 | .00445 | .00344 |  |
| V-9 | .00658 |  |  | .00350 | .00462 | .00362 |  |
| VI-1 | .00727 |  | .00323 | .00392 | .00511 | .00395 | .00468 |
| VI-2 | .00701 |  | .00310 | .00376 | .00492 | .00381 |  |
| VI-3 | .00753 |  | .00332 | .00407 | .00529 | .00411 |  |
| VIII-1 | .00696 |  | .00308 | .00375 | .00489 | .00379 |  |

Table XI

| Sample No. | $\nu_{mh}$ | $\nu_{hg}$ | $\nu_{gF}$ | $\nu_{FD}$ | $\nu_{DC}$ | $\nu_{DA'}$ |
|---|---|---|---|---|---|---|
| IV-1 |  | 0.431 | 0.522 | 0.698 | 0.550 |  |
| V-1 |  | .536 | .706 | .548 |  |  |
| V-2 |  | .437 | .531 | .703 | .546 | 0.654 |
| V-3 | 0.728 | .439 | .533 | .701 | .544 | .655 |
| V-4 |  | .437 | .530 | .700 | .545 | .652 |
| V-5 |  | .444 | .541 | .703 | .545 | .644 |
| V-7 |  | .440 | .531 | .703 | .545 |  |
| V-8 |  | .442 | .537 | .704 | .543 |  |
| V-9 |  |  | .532 | .702 | .550 |  |
| VI-1 |  | .444 | .539 | .703 | .543 | .644 |
| VI-2 |  | .442 | .536 | .702 | .544 |  |
| VI-3 |  | .441 | .541 | .703 | .546 |  |
| VIII-1 |  | .443 | .539 | .703 | .545 |  |

The novelty of these optical properties is more clearly shown in Figures 3 and 4. In these figures the dash lines passing through regions M and M' indicate the general axis of $\nu_{gF}$ vs. $\nu$, and $\nu_{FA'}$, vs. $\nu$, respectively, for typical well known commercial glasses, indicated individually by $x$; and the numbered small circles in areas N and N', respectively, show the positions of these values for the correspondingly numbered glasses. It is to be understood that $\nu_{FA'}$, is equal to the sum of $\nu_{FD}$ and $\nu_{DA'}$.

In Figures 3 and 4 the positions of these values for fluoride glasses are indicated by small triangles in areas P and P', respectively. The limits of these areas are not exact and are not indicated except as they are to be inferred from the data as given.

Although our illustrative examples are predominantly simple systems, it is well known that the introduction of small amounts of various compatible ingredients or constituents usually helps to prevent devitrification or other phase separation and to increase the chemical durability of the glass. Likewise, some of the calcium content may be replaced by a corresponding amount, atom for atom, of a chemically similar element such as barium, and other analogous substitutions may be made. It is also to be noted that although $P_2O_5$ and other simple oxides are listed in the formulas given, phosphates, in which these simple oxides are combined, may be and are usually used. Furthermore, one may use compounds, such as $NH_4H_2PO_4$ or $(NH_4)_2BeF_4$, which, on heating, produce one or more of the desired components, plus one or more volatile components. Another pertinent observation is that the designation of a two-or-more component glass in terms of a given set of components is not unique. For instance, a hypothetical glass designated as $BaF_2.Be(PO_3)_2$ may be as correctly described as $BeF_2.Ba(PO_3)_2$ or $BaF_2.BeO.P_2O_5$ or $$BeF_2.BaO.P_2O_5$$

or $5BeO.5BaO.4-P_2O_5.2PF_5$ or in other ways. To make a beryllium barium fluophosphate glass one may heat together appropriate amounts of $(NH_4)_2BeF_4$ and $Ba(PO_3)_2$, or of $BaF_2$ and $Be(PO_3)_2$, etc. For these reasons we do not restrict our claims to any particular combination of compounds originally used in the batch, as these chemical equivalents may be used; and the claims are to be interpreted as including such equivalents.

In melting these glasses, the raw materials should contain no water or moisture. Platinum vessels may be safely used if there are no organic substances, reducing agents, or compounds containing boron present. Since most of these glasses melt in the temperature range 500–850° C., they can also be melted in a pure silver vessel if due precautions are observed. The batch should be mixed thoroughly. The time of melting depends on the composition, the size of the melt, and the temperature applied. It varies from about 5 to about 100 minutes for melts of 20 to 1000 grams, at about 850° C. The melted liquids are usually yellowish in color and rather fluid. The fluidity varies slightly with the alkali metal content. The higher the alkali metal content, the more fluid the liquid. A cover for the melting vessel is necessary in order to cut down the volatilization of vapors. Volatilization loss is a function of composition, temperature, and heating time. Our success of melting these glasses is a result of our realization of the fact that they can be melted in such a low temperature region. For each glass composition it is important that the optimum temperature range should be used, and the time at the higher temperatures should be made as small as possible, in order to cut down the volatilization loss. Under careful control, the total volatilization loss is rather small (about 5 per cent of the total weight of the melt) and the effect of volatilization on the optical properties is also small, as evidenced by the unusually high Abbe values of these glasses. After melting to a clear liquid, the temperature may be lowered about 150° C., and the liquid may be stirred by a platinum or silver stirrer driven by a motor. The liquid is then poured to a mold at a temperature range 200–330° C. The optimum molding temperature (like the optimum melting temperature) is a function of the amount of alkali metal fluoride present. The high alkali-metal-containing glasses have both low melting and low molding temperatures. Most of these glasses are durable to moisture attack, with the exception of a few that contain very high alkali metal fluorides.

The melting of a typical batch may be recorded as follows: One kilogram of the batch of Example VI-5 was mixed and fed into a covered platinum beaker of about 500 cc. capacity in a furnace with apparent temperature about 920° C. It took about one and one-half hours to feed all the batch in and to obtain a fluid liquid. The liquid was heated for about one-half hour to allow complete solution of all ingredients. The furnace temperature was then lowered to about 800° C. and the liquid was stirred with a motor-driven platinum stirrer for a few minutes. The liquid was then poured into a mold which, at the time of pouring, was at a temperature of about 300° C. A clear glass resulted after cooling down slowly in the molding oven.

Although most of the examples herein given include alkali metal fluoride and have an F/P ratio not greater than 2.9, it is to be understood that we consider as within the scope of our invention fluophosphate glasses without alkali metal, as instanced in Table IX. Other examples within the scope of our invention are to be found in an application, Serial No. 644,179 filed concurrently by Kuan-Han Sun, one of the present inventors, who is the sole inventor and discoverer of the subject matter therein disclosed and specifically claimed. Certain of the examples therein given have an F/P ratio greater than 2.9 and a value of $n_D$ greater than 1.55, within the area A shown in Figure 2.

Having thus described our invention, what we claim is:

1. A fluophosphate optical glass consisting of the fused heat reaction product of a batch including by weight: lithium fluoride, 8 to 39 per cent; calcium fluoride, 0 to 39 per cent; and an aluminum phosphate, 40 to 76 per cent, the atomic proportion of fluorine to phosphorus being between 0.23 and 2.9, the remainder being compatible material.

2. A fluophosphate optical glass consisting of the fused heat reaction product of a batch including by "molecular" proportions: lithium fluoride, 29 to 87 per cent; calcium fluoride, 23 to 35 per cent; barium fluoride, 12.5 to 20 per cent; and an aluminum phosphate, 17 to 25 per cent; said four compounds totaling at least 75 per cent of the batch and having an atomic proportion of fluorine to phosphorus between 1.0 and 2.9.

3. A fluophosphate optical glass consisting of the fused heat reaction product of a batch including: alkali metal fluoride chosen from the group consisting of the fluorides of lithium, sodium, and potassium, 8 to 30 per cent by weight; the fluorides of magnesium, calcium, strontium, and barium totaling from 30 to 50 per cent by weight, and an aluminum phosphate totaling 40 to 62 per cent by weight; and having an $n_D$ value between 1.50 and 1.55 and an Abbe value greater than 70.0.

4. A fluophosphate optical glass consisting of the fused heat reaction product of a batch including by "molecular" proportions: lithium fluoride, 19 to 50 per cent; calcium fluoride, 9 to 35 per cent; barium fluoride, 1 to 20 per cent; and aluminum metaphosphate, 17 to 25 per cent, said glass having a refractive index between 1.45 and 1.55.

5. An optical fluophosphate glass consisting of the fused heat reaction product of a batch consisting by weight of: alkali metal fluoride chosen from the group consisting of the fluorides of lithium, sodium, and potassium, 7 to 30 per cent; fluoride chosen from the group consisting of the fluorides of magnesium, calcium, zinc, strontium, and barium, 20 to 52 per cent; and an aluminum phosphate totaling 37 to 65 per cent; said glass having an $n_D$ value between 1.45 and 1.55 and an Abbe value greater than 70.0.

6. A fluophosphate optical glass consisting of the fused heat reaction product of a batch including by "molecular" proportions as essential and predominating ingredients: alkali metal fluoride chosen from the group consisting of the fluorides of lithium, sodium, and potassium, 33 to 76 per cent; fluoride chosen from the group consisting of the fluorides of magnesium, calcium, zinc, strontium, and barium, 8 to 47 per cent; and aluminum metaphosphate, 16 to 24 per cent, the atomic ratio of fluorine to phosphorus being between 0.23 and 2.9.

7. An optical fluophosphate glass consisting of the system $AF-MF_2-R$, where AF indicates fluoride selected from the group consisting of the fluorides of lithium, potassium, and sodium, $MF_2$ indicates fluoride selected from the group consisting of the fluorides of magnesium, calcium, strontium, barium, and zinc, and R represents phosphate selected from the group consisting of the phosphates of aluminum and beryllium, and comprising AF, 7 to 54 per cent by weight, $MF_2$, 0 to 58 per cent by weight, and R, 30 to 90 per cent by weight, the atomic proportion of fluorine to phosphorus in the glass batch being between 0.23 and 2.9.

KUAN-HAN SUN.
MAURICE L. HUGGINS.

REFERENCES CITED

The following references are of record in the file of this patent:

UNITED STATES PATENTS

| Number | Name | Date |
|---|---|---|
| 1,303,268 | Drakenfeld | May 13, 1919 |